United States Patent [19]

Le Goff

[11] Patent Number: 4,507,175
[45] Date of Patent: Mar. 26, 1985

[54] FRACTIONAL DISTILLATION PROCESS AND APPLICATIONS THEREOF TO THE PRODUCTION OF THERMAL OR MECHANICAL ENERGY FROM TWO LOW LEVEL HEAT SOURCES

[75] Inventor: Pierre Y. J. Le Goff, Vandoeuvre, France

[73] Assignee: Centre National de la Recherche Scientifique C.N.R.S., France

[21] Appl. No.: 490,042

[22] Filed: Apr. 29, 1983

[30] Foreign Application Priority Data

Apr. 30, 1982 [FR] France ................................ 82 07510

[51] Int. Cl.³ .......................... B01D 1/22; B01D 3/28
[52] U.S. Cl. ...................................... 203/27; 203/72; 203/75; 203/89; 203/100; 203/DIG. 1; 203/DIG. 9; 203/DIG. 16; 202/154; 202/185 C; 202/173; 202/234; 202/158; 202/236; 202/237; 432/30; 159/1 G
[58] Field of Search ...................... 203/89, 25, 100, 72, 203/82, 92, 75, DIG. 1, DIG. 9, DIG. 16; 159/16 R, 49, 1 G, 22, 13 C, 13 A, 13 R, 17 VS; 202/236, 237, 172, 173, 154, 158, 185.3, 234; 55/16; 432/30

[56] References Cited

U.S. PATENT DOCUMENTS

| | | | |
|---|---|---|---|
| 2,540,151 | 2/1951 | Weller et al. | 55/16 |
| 2,609,059 | 9/1952 | Benedict | 55/16 |
| 3,129,146 | 4/1964 | Hassler | 202/172 |
| 3,298,932 | 1/1967 | Baver | 261/114 R |
| 3,306,346 | 2/1967 | Othmer | 202/173 |
| 3,649,471 | 3/1972 | Kunst | 202/173 |
| 3,755,088 | 8/1973 | Osdor | 202/173 |
| 4,105,505 | 8/1978 | Saari | 202/173 |

FOREIGN PATENT DOCUMENTS

| | | | |
|---|---|---|---|
| 0016506 | 10/1980 | European Pat. Off. | 202/158 |
| 0034920 | 9/1981 | European Pat. Off. | 159/13 R |
| 0066790 | 12/1982 | European Pat. Off. | 203/89 |
| 2705322 | 8/1978 | Fed. Rep. of Germany | 202/158 |
| 3122651 | 12/1982 | Fed. Rep. of Germany | 202/158 |
| 1596365 | 12/1967 | France | 159/13 A |
| 2333542 | 7/1977 | France | 159/13 A |
| 0612356 | 7/1979 | Switzerland | 202/158 |
| 0850099 | 7/1981 | U.S.S.R. | 203/89 |

Primary Examiner—Wilbur Bascomb
Assistant Examiner—Virginia Manoharan
Attorney, Agent, or Firm—Steinberg & Raskin

[57] ABSTRACT

A novel fractional distillation process and applications thereof to the production of thermal or mechanical energy from two low level heat sources wherein a mixture of two highly non-ideal reactive solutions such, for example, as of the water/ammonia type, is separated into its water and ammonia components in an apparatus comprising a cascade of condensers and evaporators operating respectively at the temperature of the cold source and at the temperature of the hot source and at staggered pressures. The residue and distillate formed are remixed in a mixing apparatus when it is desired to recover the thermal energy of dilution of the solutions.

The invention is applicable, in particular, to the heating of buildings from low level thermal energy and from the thermal energy of "cold wind".

23 Claims, 13 Drawing Figures 38
41

38'  41'

FRACTIONAL DISTILLATION PROCESS AND APPLICATIONS THEREOF TO THE PRODUCTION OF THERMAL OR MECHANICAL ENERGY FROM TWO LOW LEVEL HEAT SOURCES

BACKGROUND OF THE INVENTION

This invention relates to fractional distillation processes and the applications of such processes to the production of thermal or mechanical energy from two low level heat sources.

In applicant's previous French patent application No. 80 17676 of Aug. 11, 1980, apparatus are disclosed for delivering heat from two low level heat sources to a higher level, by using a succession of evaporation-mixing operations of highly non-ideal reactive solutions such, for example, as previously prepared water and ammonia. The prior preparation of these solutions required more or less conventional distillation or separation devices and processes.

In another of applicant's French patent applications, No. 81 15263 of Aug. 6, 1981, a process and apparatus are disclosed for storing, in chemical form, mechanical or thermal energy. This method and apparatus also requires the prior preparation of such highly non-ideal reactive solutions and their subsequent remixing when the stored energy is to be recovered. There is no disclosure in this application of any special means for the regeneration of the solutions, the assumption being that conventional processes and devices would be used.

SUMMARY OF THE INVENTION

The present invention is specifically directed to a novel fractional distillation process.

The process for the separation of a solution of a given composition comprising at least two components, respectively designated solvent (more volatile) and solute (less volatile), into two solutions of different compositions, one having a reduced solvent content (enriched in solute) and constituting a "residue" and the other having an enriched solvent content (impoverished in solute) and constituting a "distillate" is characterized in that two films of the solution to be fractionated are caused to trickle down into one and the same closed enclosure being substantially void of air and maintained at a pressure close to the boiling vapor pressure of the solution at the temperature prevailing inside the enclosure. One of the films (to be enriched with solvent) is maintained in thermal contact with a reduced temperature or "cold source" and the other one of the films (to be reduced in solvent content) is maintained in thermal contact with an increased temperature or "hot source", the temperature of the cold source and that of the hot source being respectively substantially lower and substantially higher than the previously mentioned temperature prevailing inside the enclosure. The solutions, one being enriched in solvent and constituting a "distillate" and the other being reduced in solvent content and constituting a "residue", are collected at the base of the enclosure.

Several successive cascade separations are advantageously used, such as those described above, which operate at temperatures that are substantially identical and at different pressures arranged in stages, the stage of rank n receiving as a solution to be fractionated, the distillate from stage (n−1) and the residue from stage (n+1), the final residue being obtained at the first stage of the installation and the final distillate being obtained at the last stage of the installation. Usually, and by way of example, the difference in the temperatures of the hot source and of the cold source is not large and may range, for example, from 20° to 30° C. or less, and the sources are found in the surrounding environment.

The cold source may advantageously and preferably comprise the surrounding air or "external cold wind", whereas the hot source may comprise various sources such, for example, as sources of geothermal origin or of natural artificial low level thermal throws such as waste, lake or river waters.

From the preceding brief description, it appears that the novel distillation process according to the invention employs a sequence or cascade of isothermal non-isobaric separations, whereas all known and conventional devices operate, on the contrary, at temperatures which are staggered along the distillation column, the pressure prevailing in the column being substantially the same between the base and head of the column, allowances being made for losses of head.

As will appear more clearly in the light of the following description, in addition to considerable advantages with regard to simplification of the apparatus, the novel process according to the invention will provide for the distillation or fractionation of solutions wherein the energy required for the process is obtained from hot and cold low level sources which are practically free and inexhaustible. In particular, thorough thermodynamic studies have shown that the surrounding air constitutes, at relevant latitudes and, a fortiori, at locations closer to the poles, a considerable source of "cold energy" which is infinitely superior for human needs.

As regards the applications of the process of the invention, an apparatus will be employed in which that part of the apparatus which is in contact with the moving air source comprises a surface which receives on its inner side, a part of the mixture to be fractionated which trickles down on the inner surface in the form of a thin film and on the outer side of which thermal exchange fins are mounted in a direction substantially parallel with the direction of the "winds".

By way of example, an installation can essentially comprise batteries of finned tubes arranged substantially vertically similar to a curtain of trees situated in the path of the wind.

If the hot source comprises a heat carrying fluid such as waste water or geothermal or river water, the apparatus will advantageously be shaped in the form of externally finned tubes on the internal wall of which a part of the mixture to be fractionated trickles down and will comprise an internal tube through which the heat carrying fluid flows internally and on the external wall of which the other part of the mixture to be fractionated circulates, the tubes being arranged substantially vertically and receiving at their upper part the mixture to be fractionated, the residue and distillate formed being collected at the lower part.

Using the residue and distillate formed by the process of the invention, mechanical and/or thermal energy can be collected, by remixing operations of the type described in the previously mentioned patent applications, or other specially adapted operations.

DESCRIPTION OF THE DRAWINGS

The invention, its objects and advantages will appear more clearly in the light of the following description with reference to the accompanying drawings in which:

FIG. 4 is a diagrammatic view in vertical section of an apparatus which can be used in the installations depicted in the preceding Figures;

FIG. 5 is similar to FIG. 4, illustrating another embodiment of an apparatus for performing the process of the invention;

FIG. 6 is a horizontal section view taken along line VI—VI of FIG. 5;

DESCRIPTION OF THE PREFERRED EMBODIMENTS

Figure 1:
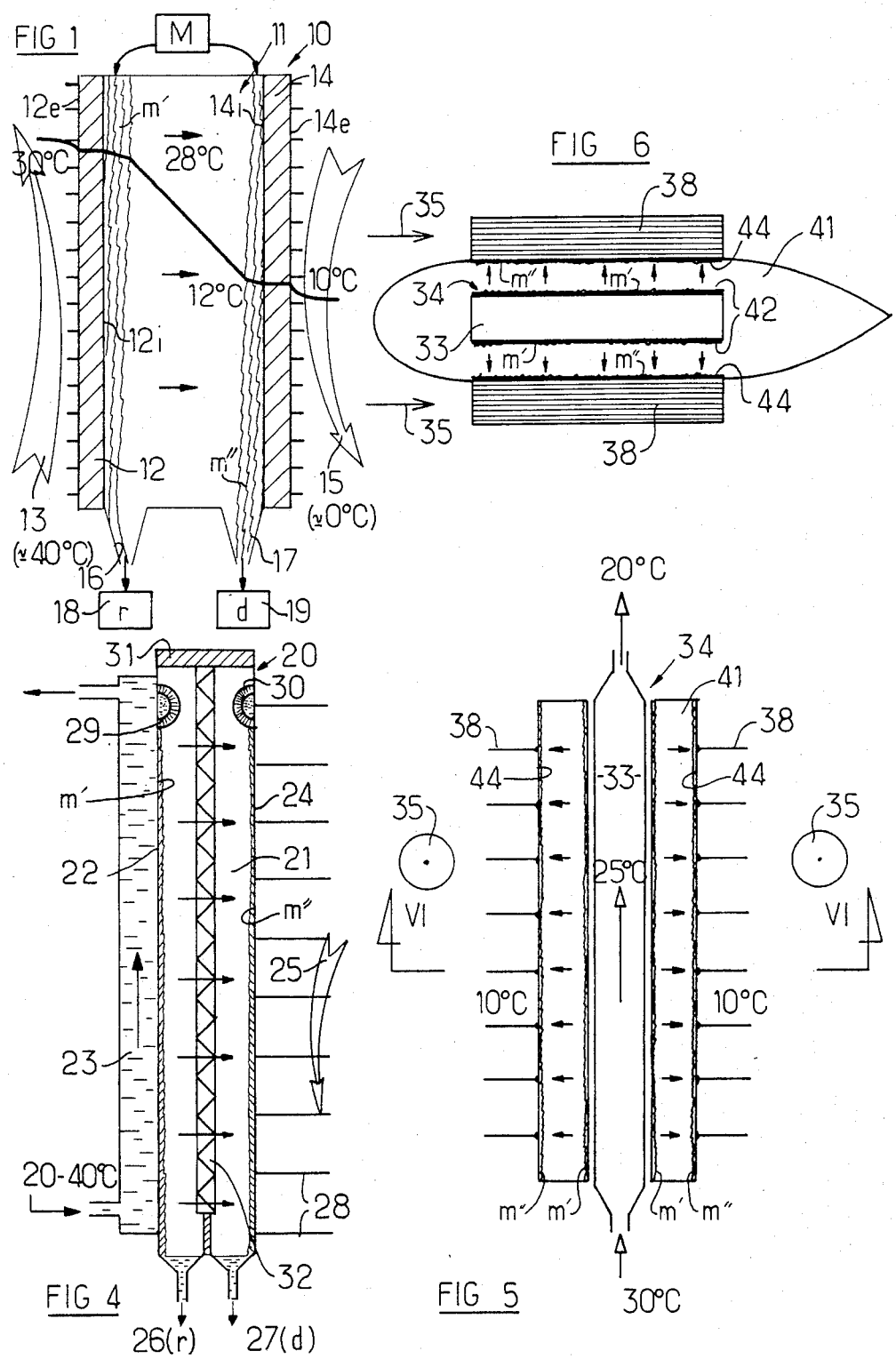
FIG. 1 is a diagrammatic view of an application of a process according to the invention.

Referring now to the drawings wherein like reference characters designate identical or corresponding parts throughout the several views, the basic principal of the "isothermal" distillation process of the present invention is illustrated in FIG. 1.

The mixture to be fractionated, designated M, is brought in liquid form to the head of an apparatus 10 comprising a closed enclosure 11 which has been voided of air. The mixture M is divided into two films m' and m" to be distilled or fractionated and which are caused to trickle down through the enclosure. More particularly, the film m' is directed into contact with a "hot" source while the other film m" is directed into contact with a "cold" source. In the illustrated embodiment, this is achieved simply by causing the film m' to trickle down on the inner side 12i of the wall 12 of enclosure 11, the outer face 12e of which is in thermal contact with a hot source as schematically represented by the arrow 13. Similarly, the film m" trickles down on the inner face 14i of wall 14 of the enclosure 11, the external or outer face 14e thereof being in contact with the cold source, schematically represented by the arrow 15.

Typically, the hot source may comprise, for example, waste water at a temperature of about 40° C. while the cold source may be constituted by a cold wind having a temperature of about 0° C. A temperature distribution will be set up within the enclosure 11 as indicated by the temperature curve shown in FIG. 1.

The films m' and m" will have substantially the same composition at the beginning, i.e., at the upper part, of enclosure 11. However, the hot film m' will be reduced in its volatile solvent as the film moves towards the lower parts of the enclosure while the cold film m" becomes enriched therein. In this manner, a "residue" having a reduced volatile solvent content and a "distillate" which is enriched in the volatile solvent are discharged from and collected at the bottom of the enclosure 11 at the points designated 16 and 17, these solutions being stored, if required, as indicated at 18, 19.

Of course, only a partial fractionation of the solution M can be carried out using the single distillation step illustrated in FIG. 1. If a more thorough fractionation is to be effected, however, several successive operations of the same type described above are carried out "in series". In this respect, reference is made to FIG. 2 which illustrates the principal of such successive fractionation steps wherein four enclosures 11 of the type illustrated in FIG. 1 are operated in series.

Figures 2, 3:
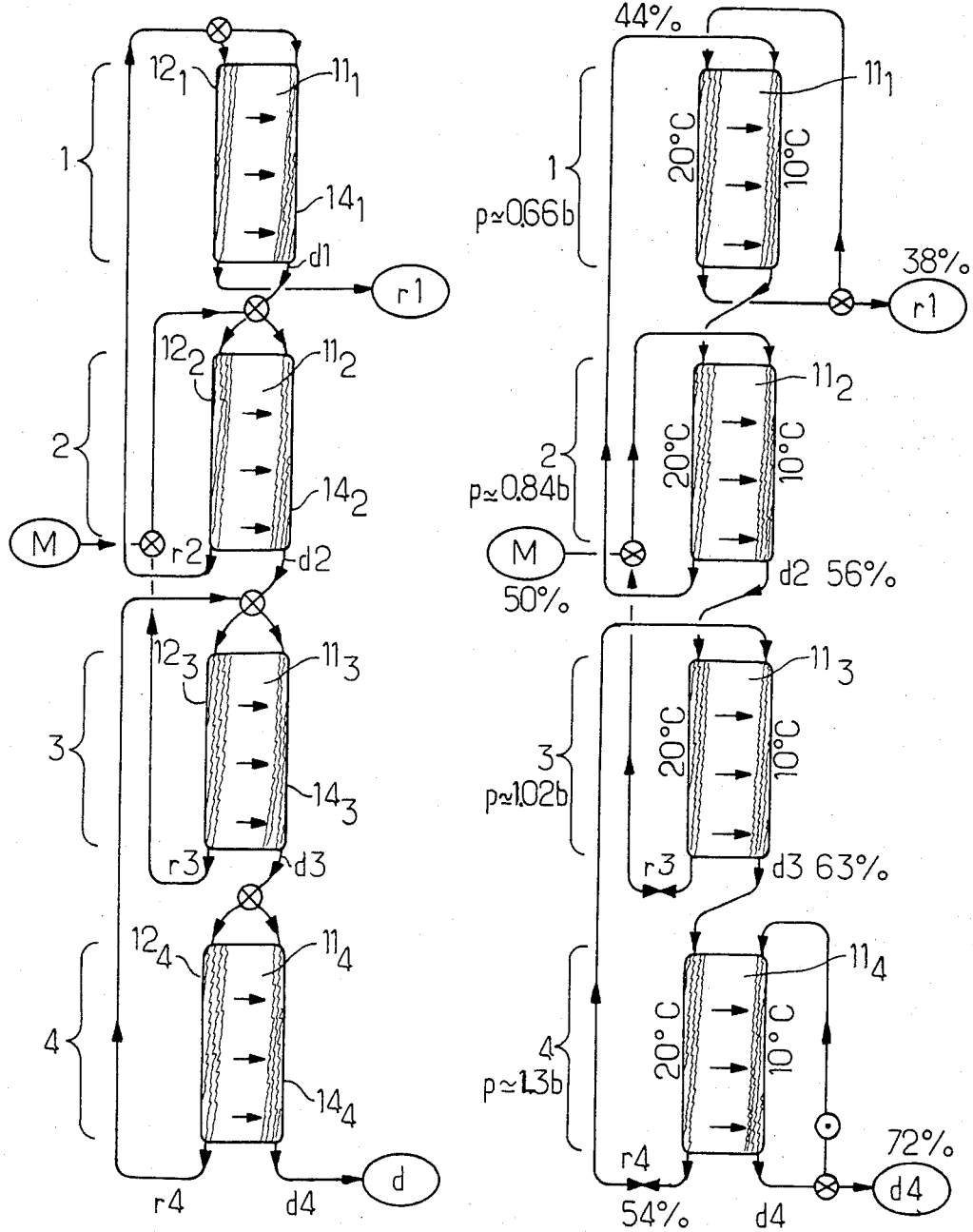
FIG. 2 is a diagrammatic view of an application of a process according to the invention in a four stage isothermal cascade.
FIG. 3 is a diagrammatic view of an installation similar to that of FIG. 2 but in which a somewhat different circulation pattern is used.

Referring to FIG. 2, four identical enclosures $11_1$, $11_2$, $11_3$ and $11_4$ are sequentially arranged. In the illustrated embodiment, the "hot" walls of the enclosures $12_1$, $12_2$, $12_3$ and $12_4$ are at 20° C., while the "cold" walls $14_1$, $14_2$, $14_3$ and $14_4$ are at 10° C. The mixture to be fractionated M is introduced at the top of the enclosure $11_2$ of the second stage. A residue r2 having a reduced volatile solvent content and a distillate d2 enriched in the volatile solvent are collected at the bottom of the second stage enclosure $11_2$. The reduced solvent content residue r2 is direct to the head of the first stage enclosure $11_1$ where it is separated into two films as described above. A residue r1 which has a super-reduced volatile solvent content and a distillate d1 which is enriched in solvent relative to residue r2 are collected. In practice, the distillate d1 will have a composition which is substantially identical to that of the starting mixture M in the illustrated embodiment and this distillate d1 is therefore recycled simultaneously with mixture M at the head of the second stage enclosure $11_2$.

The enriched distillate d2 discharged from the second stage is introduced at the head of the third stage enclosure $11_3$ by separating the same into two films in the same manner as described above. A residue r3 having a reduced solvent content with respect to the concentration of distillate d2, and a distillate d3, enriched with respect to the composition of distillate d2 are collected at the bottom of the third stage enclosure $11_3$. In practice, the residue r3 having a reduced solvent content with respect to the enriched distillate d2 of mixture M will have substantially the same composition as that mixture and is therefore recycled with it at the head of the second stage enclosure $11_2$.

The distillate d3 enriched with respect to distillate d2 is directed to the head of the fourth stage enclosure $11_4$ and is again separated into two films which trickle down the inner sides of the respective enclosure walls $12_4$ and $14_4$. At the bottom of enclosure $11_4$ a residue r4 having a reduced solvent content with respect to distillate d3 and a distillate d4, enriched with respect to the distillate d3, "doubly" enriched with respect to distillate d2, and "tripley" enriched with respect to the mixture M are collected. The residue r4 having a reduced solvent content with respect to the enriched distillate d3 will, in practice, have substantially the same composition as that of distillate d2 and can, consequently, be recycled to the head of the third stage enclosure $11_3$ simultaneously with the distillate d2. Finally, a residue r1 having a reduced solvent content and an enriched distillate d4 are removed from the column so that in a four successive stage operation a fractional distillation has been carried out. This four stage fractional distillation, is, however, carried out isothermally in that each stage is effected between the same "hot" and "cold" temperatures. It is of course understood that the pressures at the different stages are different since the equilibrium conditions of the mixtures vary at each stage, the pressures being higher as the distillate produced is enriched. In other words, the pressures progressively increase from the first to the last stage.

It will be noted that the residues and distillates obtained at the base of each stage are in liquid form and that in order to provide for the circulation of the outputs in accordance with the illustrated flow diagram, the difference in pressure is prevailing between the stages may be utilized to facilitate the recycling of the residues while simple circulation pumps are sufficient in order to transfer the distillates from the stage of a given rank to the stage of a superior rank. These circulation pumps are entirely conventional and are not shown in the figure for the sake of clarity.

The "isolation" distillation or separation process according to the present invention can be used to effect the separation or distillation of any mixture. However, since a particularly important and advantageous feature of the invention is the valorisation of low level thermal energy drawn from the practically unlimited energy reservoir constituted by the "cold wind" as regards the cold source, the separation process of the invention is most advantageously used to prepare the "residues" and "distillates" from highly non-ideal solutions in which there is a relatively large heat of solution when the "residue" and the "distillate" are placed in contact with each other.

Such solutions include, in particular, solutions of the type mentioned in the above-mentioned French patent application No. 80 17676. For example, the solutions include water/ammonia and water/lithium bromide solutions.

Of course, the process exemplified in FIG. 2 can be used with any number of stages, the separation of the residue and distillate being more thorough as the number of stages increases and each stage operates between temperatures with greater differences which are therefore more favorable to fractionation. The pressures are self-regulating from one stage to the next with the only condition being that suitable pressures be maintained at the first and last stages and that the optimum circulation flow rate be maintained at each stage.

Referring now to FIG. 3, another embodiment of a process in accordance with the present invention will now be described using, as an example, typical values obtained for an ammonia/water mixture as the solvent/solute pair.

In the arrangement illustrated in FIG. 3, a mixture M comprising 50% ammonia and 50% water is introduced at the second stage of the installation. As in the case of the embodiment of FIG. 2, the internal "hot" film which trickles down on the inner surface of each enclosure is at a temperature of about 20° C. whereas the "cold" film trickles down at a temperature of about 10° C. Differing from the arrangement of FIG. 2, the mixture M is directed only to the cold film side of the second stage in which the enriched distillate d2 is formed which is then fed to the hot film side of the next higher rank, i.e., third stage. The reduced solvent residue r3 is collected at the bottom of the hot film side of closure $11_3$, which residue is then recycled with the mixture M to the head of the second stage on the cold film side. At the third stage the cold film is obtained from the residue r4 and from the distilled ammonia vapor from the hot film side of the fourth stage to form the enriched distillate d3. The distillate d3 formed in the third stage is directed to the head of the fourth stage on the hot film side thereof. The final distillate d4 discharged from the cold film side of the enclosure $11_4$ is collected and stored, a portion thereof possibly being recycled to the head of the cold film side of the fourth stage.

The operations in the first and second stages are substantially the same as in the third and fourth stages described above, the distillate being collected at a lower rank stage being directed to the head of the next higher rank stage on the hot film side whereas the residue of the higher rank stage is recycled to the cold film side of the next lower rank stage. By avoiding the mixing of the distillate from a lower rank stage with the residue from the next higher rank stage, the efficiency of the process is improved by taking advantage of the slight differences in composition between these distillates and residues. It will be noted that at the first stage, a recycling operation of part of the final residue r1 is effected in order to feed the film on the hot side.

Various typical values for the pressure and mixture compositions prevailing at various locations of the installation are indicated in FIG. 3 for the exemplary water/ammonia solution and for the particular temperatures noted which prevail in the enclosures $11_1$, $11_2$, $11_3$ and $11_4$. It is noted that the pressures gradually increase from 0.66 bar at the first stage to 1.3 bars at the fourth stage, while the final residue r1 has a 38% ammonia content and the final distillate d4 has a 72% ammonia content.

It will of course be understood that the equilibrium conditions will vary depending upon the particular temperatures of the hot and cold sources. Furthermore, if a more thorough separation is desired, it is only necessary to use a larger number of stages. It is thus possible to calculate that with a temperature difference or "propelling force" of 10° C. between the hot and cold film sides, it will be necessary to use about 23 to 25 stages in order to effect a practical separation of the mixture into substantially pure water and ammonia. However, if the temperature difference or "propelling force" increases to 20° C., e.g., with the hot film at 30° C. and the cold film at 10° C., only 13 stages are required.

It will be furthermore noted that when the installtion is designed for the final production of mechanical or heat energy, the operation will be even more efficient since the "propelling force" will be greater. More particularly, where the outside temperatures are very low the great "coldness" of the wind will make it possible to operate the installation in a more efficient manner than when the wind is not so cold. In other words, as the ambient climate becomes colder, it becomes easier to heat the inside of a building or the like.

Referring now to FIG. 4, a more detailed description of the structure of a particular fractionating stage of the type used in the arrangements shown in the preceeding figures follows.

The apparatus, generally designated 20, comprises an impervious enclosure 21 including a pair of walls 22 and 24 spaced a short distance from each other and on which the respective hot and cold films m' and m" respectively trickle down. The walls 22 and 24 are formed of material having good heat conducting characteristics, such as any suitable metallic material, and are suitably treated so as to be non-reactive with the solutions being separated. The "hot" wall 22 is in thermal contact with a fluid 23 comprising the hot source such, for example, as waste water having a temperature of about 20° to 40° C. The "cold" wall 24 is provided with fins 28 which ensure a good thermal contact with the surrounding air comprising the cold source 25 such, for example, at a temperature of about 10° C. It should be noted that the coldness of wall 24 may be increased by subjecting the fins to an aqueous vapor, the evaporation of which will further decrease the temperature of the fins.

The hot film m' is fed into the head of the column by a distributor 29 while the cold film is similarly fed into the column by a distributor 30. The residue 26(r) and the distillate 27(d) discharged from the stage, respectively having reduced and enriched volatile solvent content, are collected at the base of the column. A layer of thermal insulation 31 covers the upper part of the column. Moreover, a wall 32 comprising a porous lining material extends through the length of the column and acts to prevent the accidental passage of liquid droplets from the film m' to the film m" and vice versa.

The stage apparatus can have the general shape of a parallelepiped having a height and length determined by the particular requirements of the installation. The wall 24 is preferably oriented so as to extend in a substantially parallel direction to the main direction of the wind which passes through the thin structure thereof.

Figure 7:
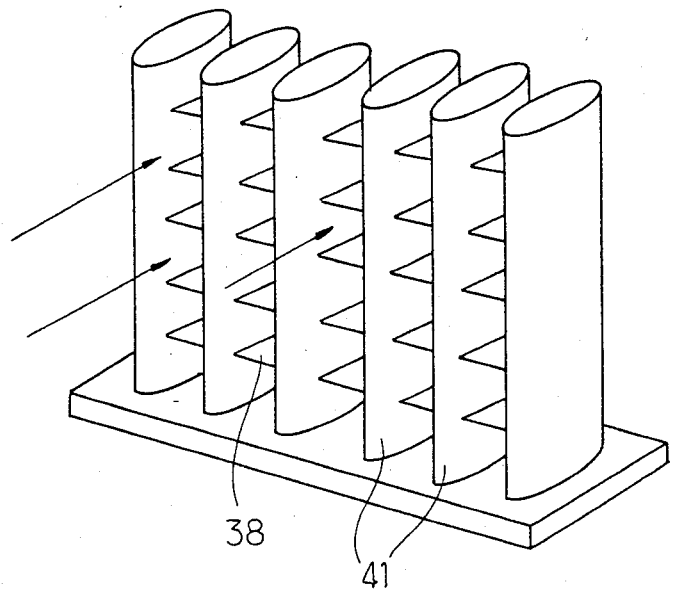
FIG. 7 is a diagrammatic perspective view illustrating devices of the type illustrated in FIGS. 5 and 6 arranged in a battery arrangement.

Referring now to FIGS. 5–7, another embodiment of the construction of a separation stage in accordance with the present invention is illustrated.

In this embodiment the separation stage, generally designated 34, comprises an impervious enclosure 41 consisting of a tube having the profile of an airfoil directed towards the oncoming wind as indicated by arrows 35. The external walls of the sections are provided with fins 38 in order to improve the heat exchange characteristics with the wind. Another tube 33 through which the hot fluid, e.g., waste water at a temperature of about 30° C., flows, is situated coaxially within the tube forming the enclosure 41. The tubes are preferably arranged substantially vertically and the hot water enters the tube 33 at its base and leaves its upper end. The hot film m' trickles downwardly on the outer surfaces of the walls 42 of tube 33 while the cold film m" trickles downwardly on the inner surfaces of the cold walls 44 of enclosure 41. Several tubes can be arranged in a group extending substantially parallel to each other in the vertical direction as shown in FIG. 7 and each tube can constitute a separate stage of a separation installation in accordance with the present invention.

Figure 8:
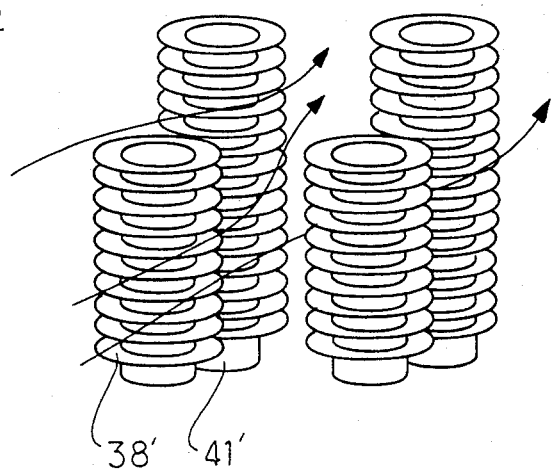
FIG. 8 is similar to FIG. 7 and illustrates a battery arrangement of finned tubes with a circular section.

Referring now to FIG. 8, another embodiment of an installation in accordance with the present invention is illustrated in which the enclosures 41' have a substantially circular cross-section. The enclosures 41' are provided with fins 38' having an angular configuration. An inner coaxial tube (not shown) is also provided through which the hot fluid flows and may also have a circular cross-section. This arrangement operates in the same manner as that illustrated in FIG. 7 and due to its construction is omnidirectional, i.e., the direction of the wind has no influence on the efficiency of the installation.

Figure 9:
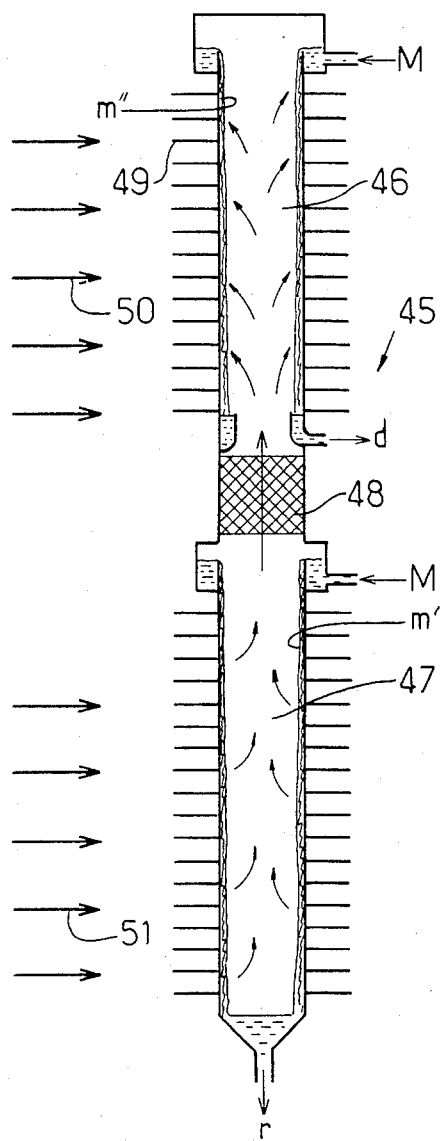
FIG. 9 is similar to FIGS. 4 and 5 and illustrates another embodiment of an apparatus for the application of a process according to the invention.

Referring now to the embodiment illustrated in FIG. 9, an apparatus comprising a fractionating stage, generally designated 45, which operates at a given pressure, essentially comprises two enclosures, namely, a cold enclosure forming a condenser 46 and a hot enclosure constituting an evaporator 47, the apparatus being closed so as to be impervious to the atmosphere but communicating with each other preferably through a porous lining forming a deblistering member 48. The condensor 46 is provided with external fins 49 which are exposed to the cold wind, schematically designated by arrows 50 while the evaporator is placed in contact with the hot source such, for example, as lukewarm water at a temperature of about 20° to 30° C., schematically shown at 51. The cold film m" trickles down the inner walls of the enclosure through condenser 46 to become enriched in vapor of the volatile solvent which evaporates from the hot film m' which flows over the inner wall of the hot evaporator enclosure 47. The mixture M to be fractionated is introduced as in the case of the embodiments of FIGS. 1–3 to the head of the condenser 46 in order to feed the films m" and to the head of the evaporator 47 to feed films m'. A distillate d enriched with volatile solvent is collected at the bottom of the condenser 46 while the residue having a reduced volatile solvent content is collected at the bottom of the evaporator 47.

Figure 10:
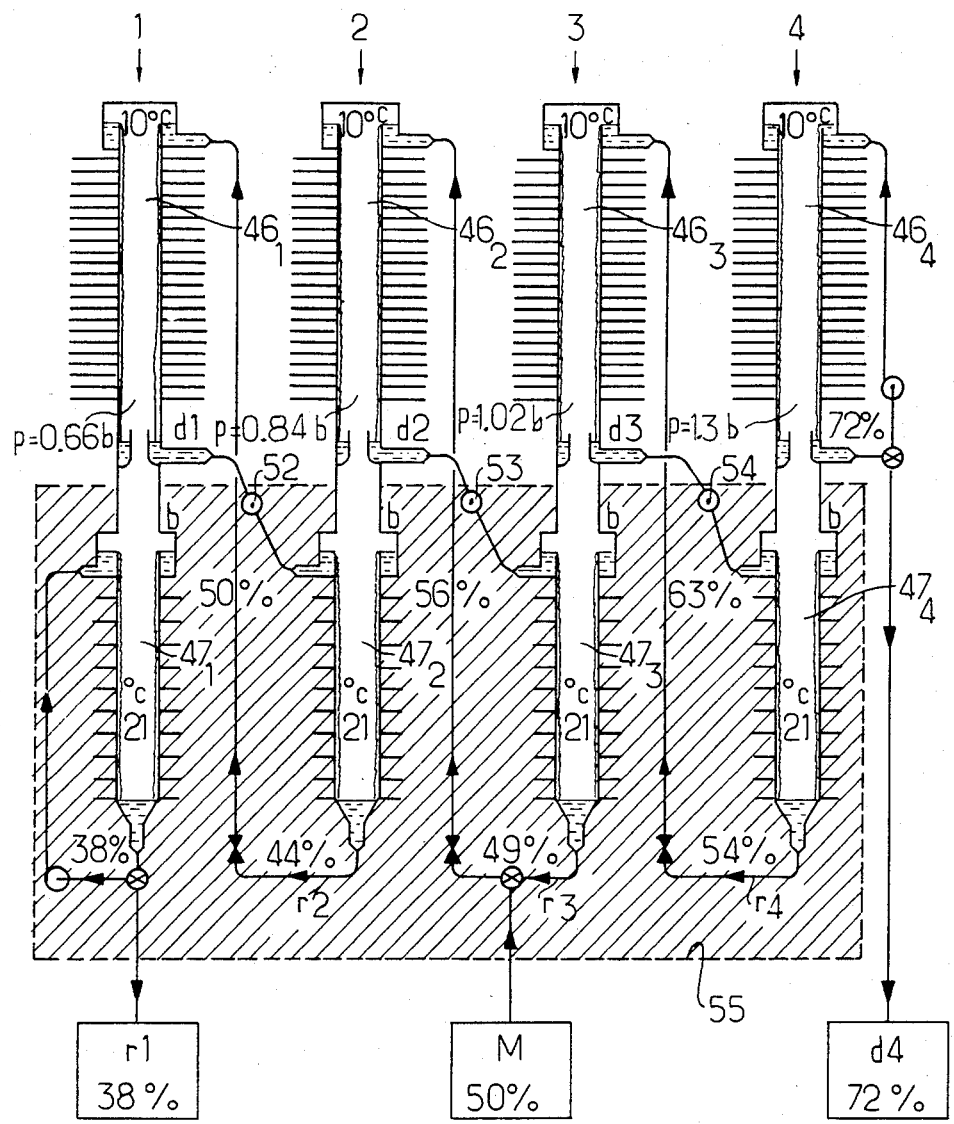
FIG. 10 is a diagrammatic view of a four stage battery arrangement of devices of the type illustrated in FIG. 9.

Referring to FIG. 10, an embodiment of an installation is shown which includes a group of four stages in series, the stages being arranged in a manner identical to that of the embodiment of FIG. 3. Three pumps 52, 53 and 54 direct the flows of respective distillates d1, d2 and d3 collected at the first three stages $46_1$, $46_2$ and $46_3$ to the heads of the higher pressure evaporators of the stages $47_1$, $47_2$ and $47_3$ of higher ranks. Since the operating conditions of the installation illustrated in FIG. 10 are the same as those of the installation of FIG. 3, the same residues and distillates will be obtained from the same supply solution at the head of the first stage and at the base of the last stage so that further description in this regard is not required.

In operation, the condensers in practice are simply exposed to the cold wind whereas the evaporators are immersed in an enclosure, designated 55, which contains, for example, waste water at the temperature of the hot source.

It is of course understood that as in the case of the arrangement illustrated in FIG. 3, any number of stages can be used in series, the number of stages increasing as a more thorough separation is desired.

Figure 11:
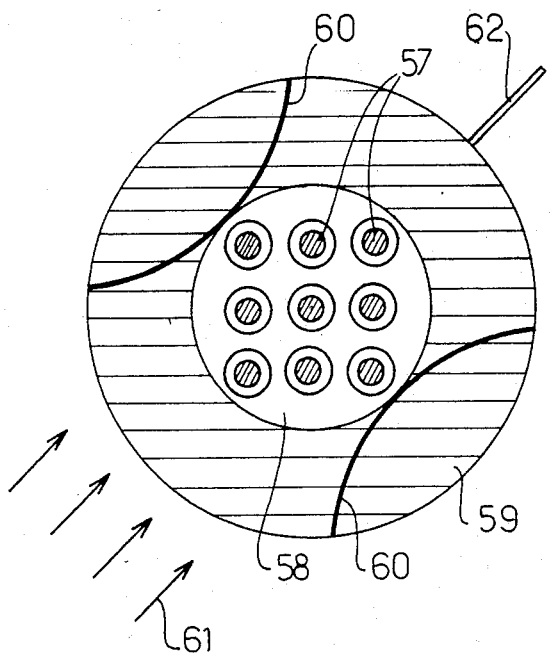
FIG. 11 is a horizontal cross-sectional view illustrating the manner in which exchange tubes can be integrated so that the energy of the wind can be used more efficiently in accordance with the invention.

Referring to FIG. 11, an embodiment of a finned tube construction is illustrated which optimizes the cooling heat exchange between the finned tubes and wind through the mounting of the tubes within a directional structure which channels the wind in an appropriate direction.

More particularly, according to the embodiment illustrated in FIG. 11, nine finned exchange tubes 57 are mounted on a stationary platform 58. The platform is surrounded by a rotating annular plate 59 on which the two walls 60 of a directional nozzle are mounted, the nozzle presenting a wind-gathering opening for gathering the wind designated 61. The nozzle is oriented by a plate 62 which functions as a wind direction vane. Thus, the plate 62 is formed integrally with the rotating plate 59 and automatically becomes situated in the direction of the eye of the wind. Thus, the airflow directed onto the tubes 57 is maximized thereby increasing the efficiency of the cold source constituted by the wind. The tubes 57 can have a construction such as that shown in FIG. 8 or may even be constituted by the tubes illustrated in FIG. 10.

Figure 12:
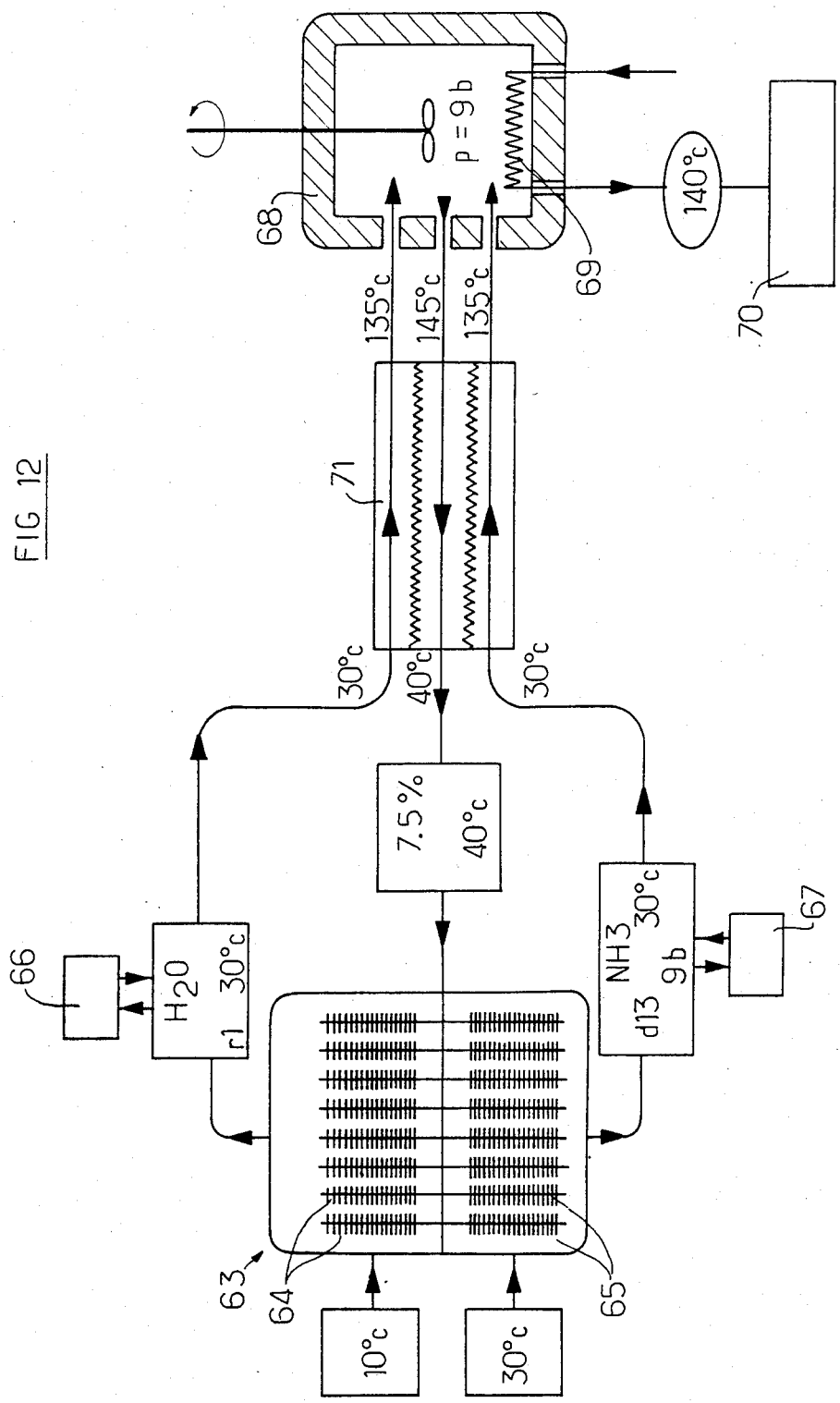
FIG. 12 is a diagrammatic view of an application of the invention to high level heat production from a hot source and from a low level cold source.

Referring now to FIG. 12, an application of the invention specifically adapted to heat a fluid to a relatively high temperature is shown. In the example, the fluid is heated to a temperature of about 140° C.

In the illustrative example illustrated in FIG. 12, a water/ammonia mixture is operated upon with condensers and evaporators of the type described in connection with FIG. 10.

The separator, generally designated 63, comprises thirteen stages grouped in series in a manner similar to the four stages illustrated in FIG. 10. The thirteen stages include thirteen condenser tubes 64 (similar to the condenser tubes 46) and thirteen evaporator tubes 65 (similar to the evaporator tubes 47). It is noted that only eight tubes are illustrated in FIG. 12. The tube 64 are exposed to a cold source such, for example, as the wind to obtain a temperature of about 10° C. while the tubes 65 are subjected to a heat source such, for example, as waste water at a temperature of about 30° C.

Substantially pure water discharged from the installation 63 at 30° C. is collected at the base of the first evaporator stage 65 for eventual storage at 66. Distillate d13 is collected at the base of the last condenser stage which consists of practically pure ammonia under a pressure of 9 bars heated to a temperature of 30° C. by the heat source prior to leaving the installation. The distillate is eventually stored at 67.

When high temperature heat is to be generated, the pure water produced by the installation (or retrieved from storage 66) and the pure ammonia produced by the installation (or retrieved from storage 67) are admitted for mixing into a thermally insulated impervious enclosure 68. Under these conditions, the mixing is effected adiabatically, i.e., without any input of external heat, to give rise to a mixture containing 7.5% ammonia at 145° C. under a pressure of 9 bars, the temperature increase resulting from the release of the heat of dilution of the solutions. The heat is extracted from the enclosure 68 by an exchange circuit 69 comprising, for example, a water coil under pressure which can thereby produce heat, such as at 140° C., for any appropriate use, designated 70.

The mixed solution discharged from the enclosure 68 enters a heat exchanger 71 which preheats the water and ammonia to about 135° C. before being recirculated to the enclosure 68 as shown in FIG. 12. The mixture M is discharged from the heat exchanger at about 40° C. with an ammonia concentration of about 7.5%. This mixed solution is returned to the installation 63, in particular between the second and third stages of the installation, two stages of the installation being provided for the production of the residue r1 of pure water and eleven stages of the installation being for the production of the distillate d13 of pure ammonia. The installation may be used, for example, for the preparation of water vapor at an average pressure using cold wind as the cold source and waste water at a temperature of about 30° C. as the hot source. It is noted that the installation comprises substantially no mechanical members other than the several liquid circulation pumps so that its operation is very reliable with a relatively low energy consumption.

Figure 13:
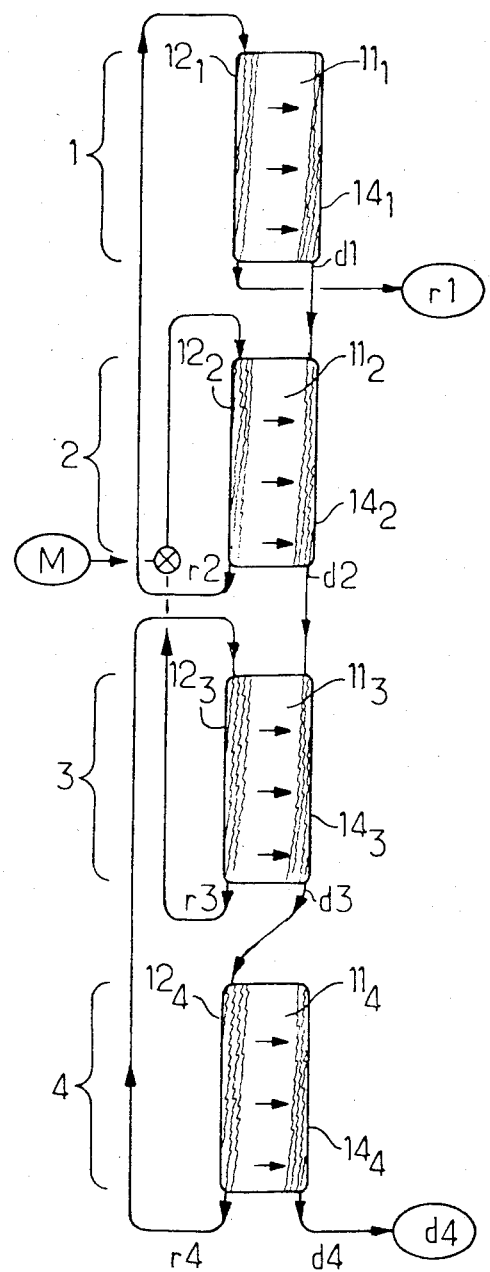
FIG. 13 is a view similar to FIG. 3, illustrating another embodiment.

Finally, referring to FIG. 13, an arrangement similar to FIG. 3 as illustrated. The installation shown in FIG. 13 differs however, from that illustrated in FIG. 3 in the following respects:

(1) the distillate discharged from the stage n is introduced at the head of the stage (n+1) on the cold film side (and not on the hot film side) except in the case of the last stage;

(2) the residue discharge from a stage n is introduced at the head of the stage (n−1) on the hot film side (and not on the cold film side); and (3) the first and last stages do not provide for any recirculation of the products.

The installation illustrated in FIG. 13 has the advantage of being simpler in construction and requiring less energy for its operation than that shown in FIG. 3.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A process for separating and fractionating a starting solution having a composition comprising at least two components, namely a more volatile solvent and a less volatile solute, into two solutions of different compositions, namely a residue solution having a decreased solvent and enriched solute concentration and a distillate solution having an enriched solvent and decreased solute concentration, comprising at least one operation stage including the steps of:

separating the first and second films of the starting solution by causing them to trickle down through a single closed enclosure, the closed enclosure being substantially void of air and maintained at a pressure close to the boiling vapor pressure of the starting solution at the particular temperature prevailing within the enclosure;

maintaining the first film in thermal contact with a cold source and the second film in thermal contact with a hot source, the temperatures of the cold and hot sources being respectively substantially lower and substantially higher than the particular temperature prevailing within the enclosure, the first film thereby becoming enriched in solvent to constitute the distillate solution and the second film thereby obtaining a reduced solvent concentration to constitute the residue solution; and collecting the enriched solvent distillate solution and the reduced solvent residue solution at the base of the enclosure.

2. The method of claim 1 wherein the hot and cold sources are found in the environment surrounding the enclosure and the difference in temperature between the hot and cold sources is relatively small.

3. The method of claim 2 wherein the temperature difference is in the range of about 20°–30° C.

4. The method of claim 2 wherein the cold source comprises the air or cold wind surrounding the enclosure.

5. The method of claim 2 wherein the hot source comprises geothermal heat.

6. The method of claim 2 wherein the hot source comprises heat collected in a solar collector.

7. The combination of claim 2 wherein the heat source comprises low level thermal discharges.

8. The method of claim 1 wherein the process comprises several respective operation stages and wherein respective enclosures of said stages are arranged in a cascade sequence, said stages being operated at substantially identical temperatures and at different respective pressures, and including the steps of introducing at a stage n as a solution to be fractionated a distillate solution of the stage (n−1) and the residue solution of the stage (n+1), the final residue solution being obtained at the first stage and the final distillate solution being obtained at the last stage.

9. The method of claim 8 including the steps of introducing at stage n the residue solution of stage (n+1) on a distillate solution forming side thereof, introducing at stage n the distillate solution of stage (n−1) on a residue solution forming side thereof; and partially recycling the obtained final residue solution to the residue solution forming side of the first stage and partially recycling the obtained final distillate solution to the distillate forming side of the last stage.

10. The method of claim 8 including the steps of introducing at stage n the residue solution of stage (n+1) on a residue solution forming side thereof and introducing at stage n the distillate solution of stage (n−1) on a distillate solution forming side thereof.

11. The method of claim 8 including the step of introducing the starting solution to be separated at an intermediate stage.

12. The method of claim 1 wherein said separating process is used in a heating process at a certain temperature of a thermodynamic heat pump utilizing heat transfer between a heat source and a cold source and at levels below the certain temperature and in which is utilized the heat of remixing of the residue and distillate solutions obtained in the separation process, said heating process including the further steps of:
introducing the residue and distillate solutions into an impervious mixing device;
mixing the residue and distillate solutions at a certain pressure in the impervious mixing device;
recovering the heat of remixing of the residue and distillate solutions;
directing the mixed solutions through a heat exchanger;
returning the mixed solution to the head of a separating stage; and
using the so recovered heat for preheating the residue and distillate solutions before introducing the same into the mixing device.

13. Apparatus for separating a starting solution having a composition comprising at least two components, namely a more volatile solvent and a less volatile solute, into two solutions of different compositions, namely a residue solution having a decreased solvent and enriched solute concentration and a distillate solution having an enriched solvent and decreased solute concentration, comprising at least one stage, each stage including:
a closed enclosure substantially void of air and maintained at a pressure close to the boiling vapor pressure of the starting solution at the particular temperature prevailing within the enclosure;
first and second means situated in each enclosure for receiving respective films of the starting solution to be separated as said films trickle down through the enclosure;
a cold source in thermal contact with one of said film receiving means in each enclosure; and
a hot source in thermal contact with the other one of said film receiving means in each enclosure.

14. The combination of claim 13 wherein said first and second film receiving means comprise wall means having respective surfaces on which respective thin films of the starting solution to be separated trickle down.

15. The combination of claim 14 wherein at least one of said cold and hot sources comprise moving air surrounding the enclosure and wherein said film receiving means in thermal contact with said at least one of said cold and hot sources is provided with external thermal exchange fins.

16. The combination of claim 15 wherein said fins extend substantially parallel to the direction in which the moving air moves.

17. The combination of claim 15 wherein said at least one of said cold and hot sources comprise moving air to which water has been added.

18. The combination of claim 13 wherein one of said hot and cold sources comprise moving air surrounding the enclosure and the other one of said hot and cold sources comprise a heat carrying fluid, and wherein said first and second film receiving means comprise at least one outer externally finned tube on the internal surface of which one of said films trickles down, and respective inner tubes extending through respective outer tubes and through which said heat carrying fluid flows, the other one of said films being received on the external surfaces of said inner tubes, said tubes being arranged substantially vertically and receiving at their upper parts the starting solution to be separated, the residue and distillate solutions being collected at the lower parts of said tubes.

19. The combination of claim 18 wherein said outer tubes have an aerodynamically shaped cross-section.

20. The combination of claim 18 wherein said outer tubes have a substantially elliptically shaped cross-section.

21. The combination of claim 18 wherein said outer tubes are mounted on a base and further including wind channeling means mounted on said base so as to be freely pivotable for directing wind toward said tubes.

22. The combination of claim 13 wherein said apparatus comprise two tubes communicating with each other through respective ends thereof, said respective tubes comprising said first and second film receiving means, one of said tubes being in thermal contact with said cold source and having an upper end which receives the starting solution to be separated with a distillate solution being collected at its base, the other one of said tubes being in thermal contact with said hot source receiving at its upper end the starting solution to be separated with a residue solution being collected at its base.

23. The combination of claim 22 wherein said two tubes are arranged substantially coaxially.

* * * * *